Figure 1:
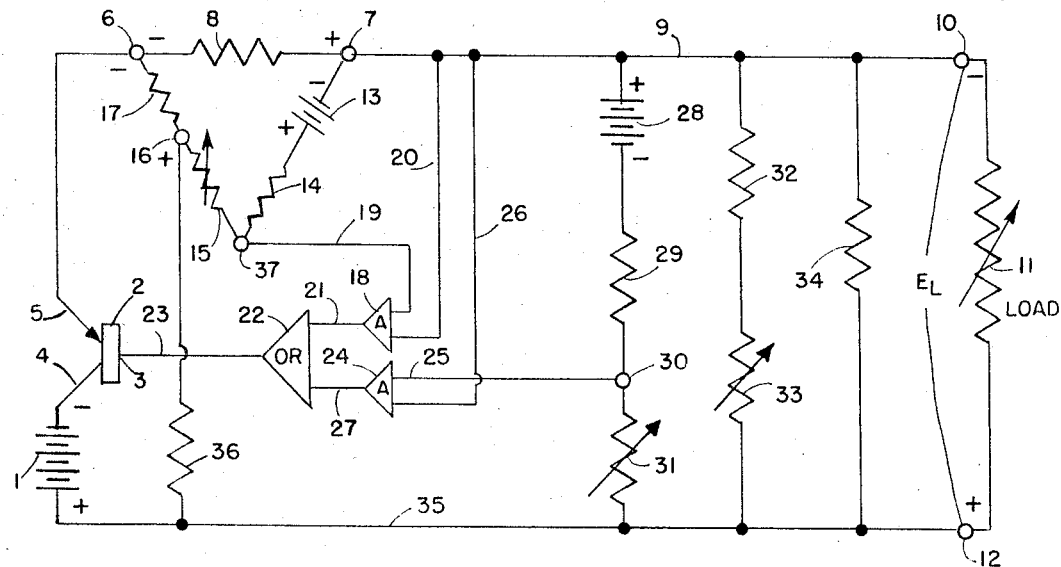

Feb. 7, 1967   J. R. GATELY   3,303,412
CURRENT REGULATED POWER SUPPLY WITH COMPENSATING
MEANS FOR EXTRANEOUS SHUNTING CURRENT
PATHS ACROSS THE LOAD
Filed Jan. 30, 1964   2 Sheets-Sheet 1

INVENTOR.
JOSEPH R. GATELY
BY
*Alfred W. Barber*
ATTORNEY

United States Patent Office 3,303,412
Patented Feb. 7, 1967

3,303,412
CURRENT REGULATED POWER SUPPLY WITH COMPENSATING MEANS FOR EXTRANEOUS SHUNTING CURRENT PATHS ACROSS THE LOAD
Joseph R. Gately, Woodside, N.Y., assignor to Forbro Design Corp., New York, N.Y., a corporation of New York
Filed Jan. 30, 1964, Ser. No. 341,236
4 Claims. (Cl. 323—4)

The present invention concerns voltage/current regulated power supplies of the automatic cross-over type and, in particular, certain refinements thereof.

A familiar type of voltage/current regulated power supply utilizes two closed loop "bridge" control circuits; one to regulate voltage to provide a voltage mode and the other to regulate current to provide a current mode. The voltage bridge circuit is shown and described in Patent No. 3,028,538 wherein a closed loop bridge circuit including a reference voltage, a reference resistor, a control resistor and the load regulates current from an unregulated power source by means of a pass transistor controlled by an error amplifier connected across a diagonal of the bridge. A modification of this circuit, in which the load current is passed through a current sensing resistor occupying the position in the bridge which the load occupied in the voltage control bridge, provides current regulation. By utilizing two bridge circuits, one for voltage and one for current, a voltage/current regulated power supply is provided and one in which the operating mode (regulated voltage or regulated current) is determined by the voltage and current control settings and the load resistance. If the load resistance of such a power supply is varied from a low value to a high value, the regulating will start out in the current regulating mode and at the point at which $R=E/I$ will change automatically to the voltage regulating mode. This cross-over has been termed the automatic cross-over point.

The current regulation of the current regulated power supply is intended to provide known regulated current to the load. However, in order to provide this regulated current, the voltage across the load must comply, i.e. must vary directly proportional to the load resistance. For this reason, any shunts across the load will cause an error in the actual load current by diverting more or less current depending on the compliance voltage. There are two circuits in particular which are usually connected across the load and which contribute to this error. One is the output voltmeter which is usually provided and the other is the voltage bridge which is usually connected directly across the load in voltage/current regulated power supplies. The present invention concerns methods of and means for compensating current regulating power supply circuits for extraneous shunts across the load circuit such as those provided by output voltmeters and voltage regulating bridge circuits.

In accordance with the present invention extraneous current paths across the load of a current regulating power supply are compensated for by means of an auxiliary current path passing through a resistor in series with the current control resistor of the current bridge and providing a corrective voltage in that bridge circuit which is proportional to the load voltage and hence also proportional to the extraneous currents drawn by the circuits shunting the load.

Accordingly, one object of the present invention is to provide methods of and means for compensating a current regulating power supply for extraneous shunt across the load.

Another object is to increase the accuracy and stability of current regulated power supplies.

A particular object is to compensate for the voltage bridge load shunting effect of a dual bridge voltage/current regulated power supply.

These and other objects will be apparent from the detailed description of the invention given in connection with the various figures of the drawing.

Figure 2:
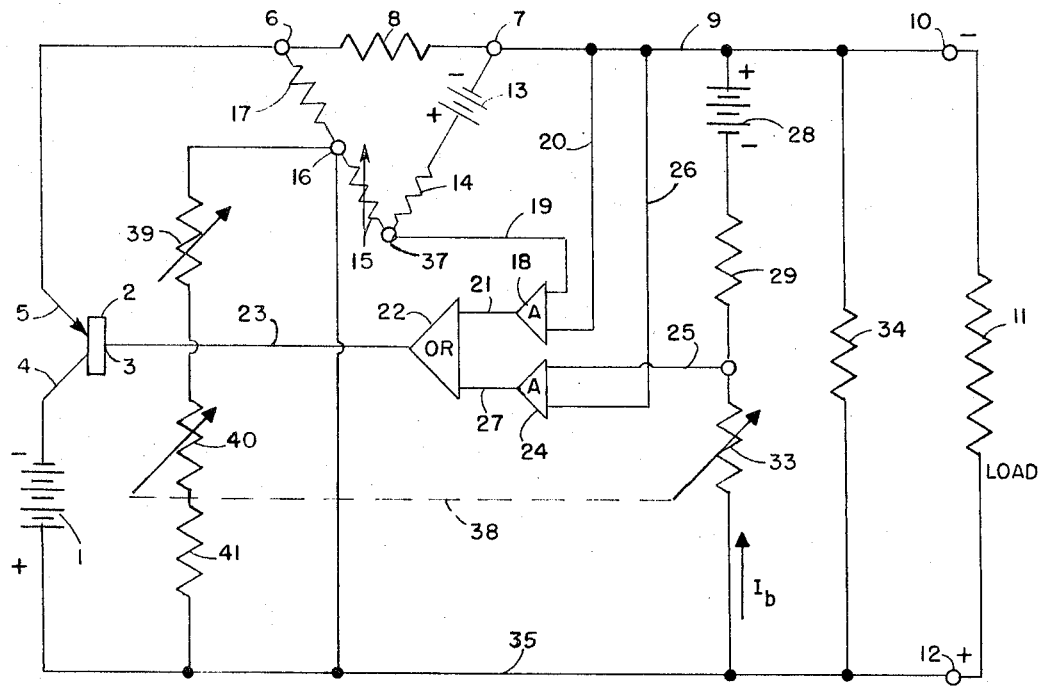
Figure 3:
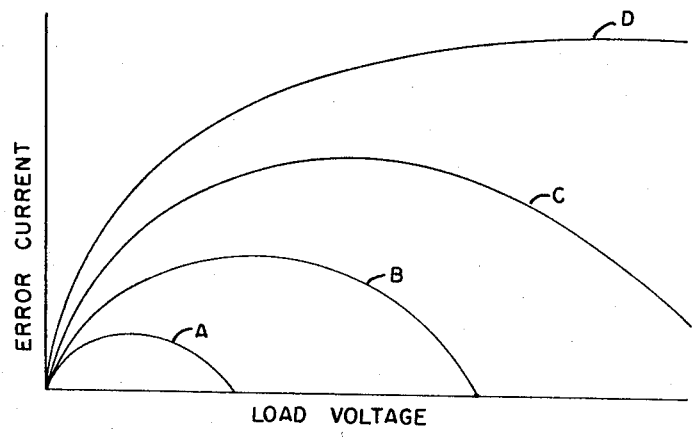

In the drawing:
FIGURE 1 is a simplified schematic circuit diagram of one form of the present invention.
FIGURE 2 is a simplified schematic circuit diagram of a modified form of the present invention.
FIGURE 3 is a series of graphs showing some typical current error components due to uncompensated voltage bridge current.

FIG. 1 is a simplified schematic circuit diagram of one form of the present invention in which a suitable source of electrical D.C. power is represented by battery 1, although this source will usually consist of an alternating current rectifier and filter providing an unregulated or partly regulated power source. In series with battery 1 is connected a series control device in the form of transistor 2. The impedance from collector 4 to emitter 5 in series with battery 1 may be controlled by a signal applied to base 3 and hence the current from battery 1 may be signal controlled. Thus, the controlled current is applied to load terminals 10 and 12 over lead 35 on one side and over lead 9 through current sensing resistor 8 connected between terminals 6 and 7 on the other. The load 11 to be supplied is connected between terminals 10 and 12. A current control bridge is formed by resistors 8, 15 and 17 forming one branch and reference voltage source 13 and reference resistor 14 in the second branch. The current flowing through resistor 8, called the current sensing resistor, produces a voltage which provides one of the bridge voltages. The error amplifier 18 is connected by means of leads 19 and 20 from the common or negative lead 9 to terminal 37 of the bridge. The output of error amplifier 18 passes over lead 21, through OR circuit 22 and lead 23 to pass transistor base 3. This circuit regulates to maintain terminals 7 and 37 of the bridge at substantially zero difference in potential. This difference in potential will be zero when the voltage drop across resistor 8 divided by the resistance of control resistor 15 is equal to the voltage of reference 13 divided by the resistance of reference resistor 14. The negligible drop across resistor 17 has been disregarded for simplicity. Thus, by varying the value of control resistor 15 the regulating action just described above controls the drop in current sensing resistor 8 and hence controls and at the same time regulates the current to the load over line 9. It is assumed for the moment that OR circuit 22 merely passes the output of error amplifier 18 directly to base 3. The description so far covers a current regulating and control circuit for providing a regulated or constant current controlled in magnitude by the value of resistor 15 to a load 11.

The problem to be solved by the present invention arises from the presence of shunt paths between conductors 9 and 35 which pass some current around the load. The bridge controls the current to conductors 9 and 35 on the assumption that all of the current passes through the load. However, a shunt path as represented by resistor 34 will by-pass some current and will therefore degrade the regulation of the current actually reaching the load resistor 11. This shunt path 34 may, for example, represent a voltmeter used to measure the voltage across the load. It has been found, according to the present invention, that compensation for this shunt current may be accomplished by introducing a voltage opposed to the drop across resistor 8 by drawing current through resistor 17 which is proportional to the load voltages. The current through resistor 17 is provided and made proportional to the load voltage by connecting an appropriate resistor 36 from bridge terminal 16 to positive line 35. Resistors 17 and 36 are chosen so that the voltage drop across resistor 17 is equal to the voltage drop across resistor 8 produced by the current in the load shunting resistor 34. In this way the two voltages always cancel each other in the bridge circuit and the shunt 34 will have little or no effect on the regulated current supplied to the load. It may be convenient to over compensate in resistor 17 and then to add a second shunt 32–33 which may be accurately adjusted by varying resistor 33 to bring the compensation into exact balance.

If the power supply also provides voltage regulation an additional shunt may be present in the form of the voltage bridge circuit. The voltage bridge circuit is represented by reference voltage 28, reference resistor 29, variable control resistor 31 and is completed through output voltage $E_L$. The voltage bridge controls the load voltage by means of error amplifier 24 connected with its input leads 25 and 26 connected from common lead 9 to bridge terminal 30 and its output lead 27 connected in controlling relationship to base 3 through OR circuit 22 and over lead 23. The regulated voltage is controlled by the setting of control resistor 31. With this voltage regulating circuit added the power supply will be controlled by either the current bridge or the voltage bridge depending on whether the load resistance is greater than or less than the resistance given by the equation $R=E/I$ where E is the voltage called for by the voltage control bridge and I is the current called for by the current control bridge. If the load resistance is greater than that called for by the above equation, the power supply will be voltage regulated and if it is less, the power supply will be current regulated. The control function changes from voltage to current or from current to voltage in the OR circuit and depends on which of amplifiers 18 and 24 provides the predominating output signal.

The voltage control bridge circuit draws current which does not pass through the load resistor and, hence it is a further source of uncontrolled shunt current. By reducing the value of resistor 36, additional compensating effect can be provided in the current bridge to off-set the voltage bridge shunting current. However, since the voltage bridge shunt path includes variable resistor 31, the shunt current is dependent on the setting of the output voltage and the compensating effect described above can be used to provide exact compensation at only one predetermined compliance voltage. The curves of FIG. 3 show how the shunting current varies with compliance voltage in some typical cases. The error current is shown along the vertical axis plotted against load voltage along the horizontal axis. Curve D shows the general form of error current vs. load voltage when there is no compensation provided. Curve C shows some improvement by compensation in accordance with the present invention. Curve B shows a typical error current vs. load voltage for a near optimum adjustment of the compensating circuit. Curve A shows an over compensated condition. All of these curves are for the simple compensating circuit of FIG. 1 which does not have the "tracking" provision described below in connection with FIG. 2.

It has been found, in accordance with the present invention, that the variable shunt current taken by a circuit such as the voltage bridge circuit can be compensated for by a variable compensation circuit such as that shown in FIG. 2. If resistor 41 is made proportional to resistor 29, and resistor 40 is made proportional to resistor 33 as by gang control, as indicated at 38, of these two resistors, and resistor 17 is chosen to provide a compensating voltage in the current bridge equal and opposite to the drop in current sensing resistor 8 produced by the shunting voltage bridge current, the effect of this voltage bridge shunt current will be eliminated from the current regulating characteristics of the power supply. In FIG. 2 instead of over compensating and then adding a shunt current path as in FIG. 1, a variable compensating path provided by series variable resistor 39 is utilized. Resistor 39 may be adjusted for very accurate setting of the compensating effect. In a similar manner other current paths shunting the load may be compensated so that the load current is accurately controlled and regulated in accordance with predetermined settings or values of the current bridge components.

While only a few forms of the present invention have been shown and described, many modifications will be apparent to those skilled in the art and within the spirit and scope of the invention as set forth in particular in the appended claims.

What is claimed is:

1. In a voltage/current regulated power supply, the combination of, a source of direct current, signal responsive control means connected in series with said source and a pair of output terminals, a four arm closed loop voltage control bridge including a source of reference voltage, a voltage bridge current control reference resistor, a variable voltage control resistor and said output terminals, a D.C. amplifier including input and output circuits, means coupling said input circuit to said voltage bridge for amplifying unbalance signals therefrom, an OR circuit coupled between said output circuit and said control means in signal controlling relationship thereto, a four arm closed loop current control bridge including at least a current sensing resistor connected between said current control means and one of said output terminals, a source of reference voltage, a current bridge current control reference resistor and a variable current control resistor, a second D.C. amplifier including input and output circuits, means coupling the last said input circuit to said current bridge for amplifying unbalance signals therefrom, means coupling the last said output circuit to said OR circuit, and means for compensating extraneous current path shunts across said output terminals including a resistor in series with said current control resistor of said current control bridge and means for passing current through said series resistor substantially proportional to the voltage across said output terminals, whereby to provide a voltage within said closed loop of said current control bridge at least partially compensating the current in said extraneous paths.

2. A voltage/current regulated power supply as set forth in claim 1 and including an adjustable resistor in series with a fixed resistor connected in shunt with said output terminals.

3. A voltage/current regulated power supply as set forth in claim 1 wherein said means for passing current through said series resistor includes a variable resistor.

4. A voltage/current regulated power supply as set forth in claim 1 wherein said means for passing current through said series resistor includes a variable resistor ganged to said variable voltage control resistor.

References Cited by the Examiner

UNITED STATES PATENTS

| | | |
|---|---|---|
| 2,962,651 | 11/1960 | McNamee. |
| 3,025,451 | 3/1962 | Hakimoglu _____ 323—66 X |
| 3,124,698 | 3/1964 | Semmer et al. |
| 3,201,680 | 8/1965 | Ross et al. _____ 323—9 |

OTHER REFERENCES

Lytel, A.: "Transistor Circuit Manual," Bobbs-Merrill Company, Inc., New York, December 1961 (pp. 212, 213).

JOHN F. COUCH, *Primary Examiner.*

A. D. PELLINEN, *Assistant Examiner.*